Patented Mar. 19, 1929.

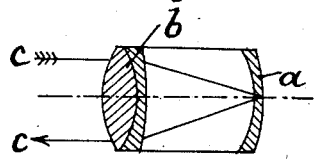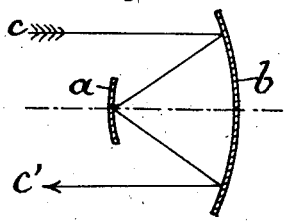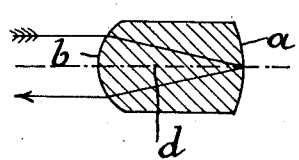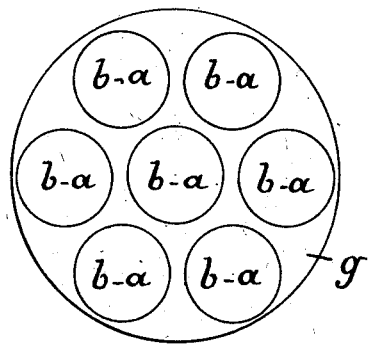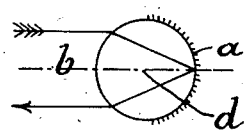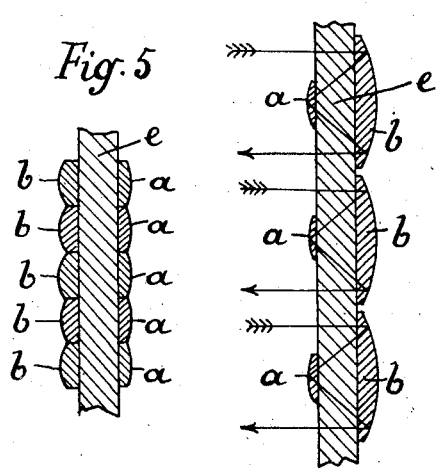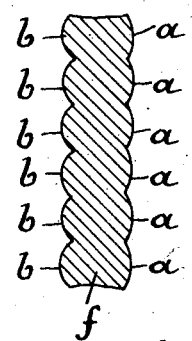

1,706,218

UNITED STATES PATENT OFFICE.

HENRI CHRÉTIEN, OF ST.-CLOUD, FRANCE. REISSUED

AUTOCOLLIMATING REFLECTOR AND APPLICATION TO OPTICAL SIGNALING AND NIGHT ADVERTISING.

Application filed November 17, 1924, Serial No. 750,420, and in France November 26, 1923.

As it is known, autocollimating reflectors have the property of reflecting light in the direction of incidence, whatever be that direction relatively to the instrument.

An example of a theoretically perfect autocollimating reflector is the Airy's triple mirror, which is obtained by disposing in one support three plane mirrors orthogonally to each other. Any ray of light which impinges on the three mirrors successively undergoes a change of path which sends it back to its original direction. The triple mirror shows however a fundamental disadvantage: the adjustment of the perpendicularity of the mirrors is very delicate and must be made frequently, especially for transportable instruments. To overcome that difficulty, the triple mirror has been made in the shape of a trirectangle tetrahedron cut out of a block of glass. But such an instrument is difficult of construction, expensive and relatively heavy. Furthermore, the divergency of the emergent beam (or of the beam, when the apparatus is not exactly adjusted) is always very small, which renders it unusable for most of the practical applications here considered.

Another scheme known for a long time is the autocollimating sight invented by Fizeau, and which consists of an astronomical lens combined with a small plane mirror placed at its focus orthogonally to its optical axis. If such a combination is illuminated with a beam of light emanating from a source located far away, the lens gives an image of it at the focus, that is to say on the mirror's plane. The mirror sends the rays back, and those rays, after getting once more through the lens go back accurately to the source, even if the mirror is not perfectly perpendicular to the optical axis.

The autocollimating sight such as Fizeau conceived it, is not suitable for optical signaling, because partly of its size and partly because of the smallness of its field.

This invention aims to improve this known scheme and comprises:—

I. Improving the autocollimating scheme of Fizeau in order to render it usable for optical signaling.

II. Introducing a divergency of any given amount in the emerging beam, so as to make the same observable from a region of chosen size all around the source of light.

III. Making autocollimating reflecting surfaces of any size and shape, by assembling simple elements of autocollimating reflectors.

IV. Application of those surfaces to optical signaling in general and to night advertising in particular.

Referring to the drawings in which like parts are similarly designated.

Figure 1 is a section showing a composite lens embodying my invention corrected astigmatically and for curvature of field.

Fig. 2 is a similar view showing the use of mirrors.

Fig. 3 shows a single lens.

Fig. 4 shows a limit of shape having lens and reflector of like curvature.

Figs. 5, 6 and 7 show different forms of lenses embodying my invention, and

Fig. 8 shows diagrammatically a group of such lenses.

*Improvements in the autocollimating scheme of Fizeau.*

The objective system can be here constituted by an ordinary type of astronomical lens, but of focal length reduced as much as possible.

In case of application to secret optical signaling, where the divergency must be at minima, it is important that the objective lens be well corrected of the spherical aberration for utilization on the axis, and of the coma flare for utilization out of the axis. The two components of the lens must be cemented together in order to avoid the loss of light by reflection on the air surfaces.

It is known that the optical conditions required can be actually fulfilled with two glasses cemented together keeping the systems achromatism by choosing conveniently the dispersive powers of the glasses.

Besides, considering selective action of the atmosphere through which blue and purple light is quickly absorbed, it is not necessary to conform rigourously to the achromatism condition. Practically it is possible, by using ordinary glass, to obtain a lens free from spherical aberration and from coma for the yellow radiations and sufficiently achromatic for its designed use.

With such lens, a good luminous field will readily be obtained with any plane mirror placed in the focal plane, provided that the incident pencil does not deviate too much from the optical axis of the system.

But if the incident pencil deviates considerably from the axis the reflected pencil will be notably diminished in its intensity, due principally to a part of the cone of reflected rays intercepted by the mounting of the lens.

To get rid of this inconvenience, it is sufficient to change Fizeau's plane mirror into a concave one have a radius of curvature equal to the focal length of the lens. In such conditions the whole of the incident cone will be reflected through the lens.

However there is still two causes of loss of light for extra axial pencils: they are astigmatism and curvature of field of the image surface.

To lessen this defect the mirror must be composed of a lens $a$ (see Fig. 1) having the shape of a divergent meniscus metallized on its convex side, the concave one being turned towards the lens $b$. The convex side will have a radius of curvature equal to the focal length of the whole system and its apex will coincide with the focus of the whole.

The radius of curvature of the concave surface will be determined by the condition of giving to the curvature of the image surface the same value as that of the reflecting surface.

Instead of the catadioptrical disposition, which has just been described, sometimes a disposition simply catoptric can be used with advantage in which the object-lens is replaced by a mirror $b$ of convenient dimensions. The apparatus shows then the arrangement represented on Fig. 2.

To reduce the divergency to its minimum, the mirror $b$ must be free of spherical aberration (parabolic mirror, or Mangin mirror, for instance).

The diameter of the mirror $a$ is determined by the field required for the sight; it will be chosen as small as possible so as not to stop too large a fraction of incident light. It may often happen that the field of positions which can be occupied by the source $c$ is more extended angularly in one direction (horizontal) than in the other (vertical). This circumstance can be used to reduce the dimension of the mirror $a$ to what is strictly necessary to cover the whole extent of the field of the image $c$. So the outline of the mirror $a$, instead of being circular, can be rectangular. In some cases, they may even be constituted by singly cylindrical reflecting plates.

*Systematic introduction of a given divergency in the emerging pencil.*

Every time that the purpose is not signaling at great distances, it is necessary to introduce systematically in the reflected luminous pencil, a certain divergency in order to render the signs easily visible to observers situated a little at the side of the source. As the light of the signals will be smaller as the introduced divergency will be greater, this divergency shall be determined for each particular application.

When Airy's triple reflector is used, the divergency will be obtained either by leaving a voluntary imperfection in the plane of the surfaces, or by placing a feebly divergent or convergent lens before each element, or when the trihedral is constituted by three surfaces of a tetrahedron by giving to the fourth surface a shape slightly convex or concave or even simply irregular, as it can be directly obtained by molding.

When using the autocollimating element derived from the Fizeau's sight, the divergency is obtained by placing systematically the mirror in front or behind the focal surface of the objective system, by an amount easily determined by calculation or better empirically.

A feeble divergency is obtained when leaving optical aberration, notably spherical aberration in the autocollimating elements, which has besides the advantage of reducing considerably their cost.

As an example of autocollimating elements where spherical aberration is not especially corrected, we can point out:

1. Catoptrical elements previously described but in which the objective-mirrors are affected with spherical aberration: we will take for instance simple spherical mirrors the quality of which need not be very good, like those obtained by bulging (glass) or stamping (metal).

2. A catadioptrical element in which the objective lens $b$ and the mirror $a$ are made of one single piece (see Fig. 3) by a lens whose limiting surfaces $b$ and $a$ are spheres, centered in $d$ with their active surfaces, opposite. If $r$ is the radius of curvature of the objective surface $b$; $n$, the refraction index of the substance in which the lens has the radius $R$. The reflecting surface $a$ will be then $$R = \frac{r}{n-1}.$$

By selecting a substance with a very high refracting index which theoretically should be equal to 2, but can practically notably differ from this limit (dense lead glasses, strass, etc.) we can bring together the values of $R$ and that of $r$ and constitute the autocollimating element by a simple spherical ball rendered reflecting on one of its hemispheres (Fig. 4).

*Autocollimating reflecting surfaces.*

In order to increase the luminous power of the autocollimating reflectors, we can enlarge their dimensions. This method presents however great inconveniences which are as follows:

1. From a certain diameter, the net cost rises much more rapidly than surface.
2. The weight of the instrument increases like power 3/2 of the luminosity.
3. The absorption of light in lenses grows very rapidly with their thickness, which is in proportion to their diameter, from which results a great reduction of luminosity.
4. And again in a condition of optical action settled beforehand the length of the instrument is proportional to its diameter.

The method proposed in conformity with the invention, consist in increasing the luminosity of the reflectors by constituting reflecting surfaces of any shape and extending by grouping the autocollimating elements, previously described and having each the most economical dimension. With these conditions the price and weight of the instrument is proportional to the luminosity required the thickness remaining constant.

The elements can be arranged to cover small or large surfaces so as to form reflecting screens, or to form letters, drawings or any signs.

We can also mount all the lenses in one and the same support, and all the mirrors in another, the two supports being joined by crossbars of a convenient length to bring the mirrors to focus, a condition that can be obtained by adjusting the divergency to be introduced in the reflected pencil and by altering the distance from the lens to the mirror.

Catadioptric autocollimating surfaces can also be obtained, as shown Fig. 5, by fixing on each side of a transparent plate $e$ of convenient thickness, convex lenses $b$ and $a$ placing them on a sheet of glass, the objective lens on one side and the mirror on other, the latter being metallized on its convex surface.

We can proceed in the same way in order to obtain catoptical surfaces, by giving to the two lenses convenient radii of curvature and by metallizing the two on their convex surfaces (Fig. 6).

The autocollimating element can be placed on a shop window and to prevent the visibility of the mirrors from the outside, such mirrors may be coated with any opaque covering.

Finally, autocollimating refracting surfaces of any dimension and shape can be obtained by shaping of the surface of the autocollimating element of any type on transparent sheet (glass, celluloid, cellophane).

In the case of catadioptrical elements, the surfaces are obtained (see Fig. 7) by shaping plates of transparent substances so as to form on each surface a spherical apex with the radii $r+R$ indicated above, and directly opposite to each other. The value $r+R$, which ensures the concentricity of the spheres, is given to the thickness between apexes.

The waved surface formed by the mirror $a$ is rendered reflecting by a suitable metallic deposit.

In the case of catoptric elements, the surface constituting the mirrors $a$ is metallized on a small area, on the mirror axis $b$, or the whole surface can receive a half transparent metallic deposit.

Very large autocollimating surfaces can be constituted by juxtaposition of smaller ones easier to obtain, as practiced for brick paving or covering of all kinds Fig. 8 shows a disposition of this type, when on a tray is grouped a great number of systems of objective-mirror $b-a$.

*Applications.*—The autocollimating elements derived from Fizeau's sight, previously described, those obtained by introducing divergency in Airy's trihedral mirror, and the reflecting surfaces obtained by grouping autocollimating elements of any nature, are applicable in general to all sorts of optical signaling without its own source of light.

From those applications, the following are indicated as descriptive but not limited examples.

*Optical telegraphy.*—Elements having very small divergency used alone or by group, operated by hand or provided with any mechanical appliance, allowing its use in a position having itself no source of light which could betray its presence so as to be able secretly to communicate with a lighting post situated very far away for instance an agent corresponding over the enemy's camp; ships at sea corresponding between them or with the coast; or an airship in optical communication with a post on the ground etc. . . .

*Optical signaling.*—Signals of any sort can be constituted by autocollimating reflectors with more or less divergency and which appear luminous to those who are quite near a source of light for example:

All railway signals lighted by sources placed on engines, and behind which stand those who observe the track this eliminates dangers coming from accidental extinctions of the lamps; corner post indicators; dangerous descent; railroad crossings etc. . . . placed along the roads in the country and which lighted by lanterns or search lights of wagons or cars, shine very brightly to the conductor's eyes and impose themselves upon his attention.

Indicator names of streets, numbers of houses etc. . . . readable at night by approaching any small luminous source in front of the eye: pocket electric lamp, flint, even an ordinary match.

Number placed behind wagons or ships, train back lanterns, numbers placed in front of the engines.

*Advertising.*—Advertising sign, placed along roads or railways legible at night without special light and by simple reflection to the eyes of the travelers, of the almost totality of the light coming from lamps in the cars, can be constituted.

Marks placed on shop windows.

The invention is applicable to the construction of large fixed screens on which can be projected, by means of ordinary projecting lanterns, fixed or animated pictures, advertising signs legible by those persons who are near the lights of a café for instance. On a screen of this description a plurality of pictures may be projected simultaneously from different sources and angles. These signs although projected on the screen at the same time as those of a different character do not become confused one with the other as each separate picture is only visible from the angle of projection.

*Aviation.*—Autocollimating surfaces can be constituted which placed horizontally on the ground at intervals will give at night to aviators flying above them useful indications, such as direction of the wind, with indications such as these it would not be necessary for an aerodrome to exhibit lighted signals. If the autocollimating elements are placed at exactly measured distances from each other, the aviator can determine his exact altitude above the ground at night, by means of any single stadimetric device and so may choose the exact moment for landing.

I claim—

1. An auto-collimating sight, comprising an objective lens of short focal length attached to one side of a sheet of glass, an axially alined lens attached to the other side thereof, the curvature of the objective lens having a radius equal to the focal length of the combination of the two lenses and the other lens having its outer face formed as a reflector.

2. An auto-collimating sight, comprising an objective lens of short focal length and an alined smaller lens having its exterior surface a reflector and smaller than the objective, the radius of curvature of the objective lens being substantially equal to the focal length of the combination of the two lenses and the reflecting surface of the smaller lens lying substantially in the focal plane of the objective.

3. An auto-collimating sight, comprising an objective lens of short focal length secured to one face of a sheet of glass and a smaller lens secured to the opposite face of said sheet, the outer faces of both lenses being reflectors and the reflecting outer face of the smaller lens being substantially in the focal plane of the larger lens.

In testimony that I claim the foregoing as my invention, I have signed my name.

HENRI CHRÉTIEN.